(12) United States Patent
Tiffany

(10) Patent No.: US 7,375,571 B1
(45) Date of Patent: May 20, 2008

(54) GLITCH FREE CLOCK MULTIPLEXER THAT USES A DELAY ELEMENT TO DETECT A TRANSITION-FREE PERIOD IN A CLOCK SIGNAL

(75) Inventor: William J. Tiffany, Eagle, ID (US)

(73) Assignee: ZiLOG, Inc., San Jose, CA (US)

( * ) Notice: Subject to any disclaimer, the term of this patent is extended or adjusted under 35 U.S.C. 154(b) by 18 days.

(21) Appl. No.: 11/445,851

(22) Filed: Jun. 3, 2006

(51) Int. Cl.
*G06F 1/04* (2006.01)

(52) U.S. Cl. .......................... 327/298; 327/99

(58) Field of Classification Search ................. 327/99, 327/298, 365, 407–410
See application file for complete search history.

(56) References Cited

U.S. PATENT DOCUMENTS

| | | | |
|---|---|---|---|
| 5,319,678 A | 6/1994 | Ho et al. | 375/354 |
| 5,502,409 A | 3/1996 | Schnizlein | 327/99 |
| 5,539,337 A | 7/1996 | Taylor et al. | 326/94 |
| 5,731,715 A | 3/1998 | Mote, Jr. | 326/93 |
| 6,075,392 A | 6/2000 | Sandner | 327/145 |
| 6,266,780 B1 | 7/2001 | Grundvig et al. | 713/501 |
| 6,292,044 B1 | 9/2001 | Mo et al. | 327/298 |
| 6,324,652 B1 | 11/2001 | Henderson et al. | 713/500 |
| 6,501,304 B1 | 12/2002 | Boerstler et al. | 327/99 |
| 6,593,780 B2 * | 7/2003 | Lammers | 327/99 |
| 6,784,699 B2 | 8/2004 | Haroun et al. | 327/99 |
| 7,039,146 B2 | 5/2006 | Chiu | 375/373 |

FOREIGN PATENT DOCUMENTS

WO  WO 03/044996 A2  5/2003

OTHER PUBLICATIONS

IBM Technical Disclosure, Gartmann et al., "Method To Select One Of Two Clocks While Avoiding Narrow Pulses," vol. 32 No. 98, Feb. 1990, pp. 82-84, printout from Delphion.

* cited by examiner

*Primary Examiner*—Tuan T Lam
*Assistant Examiner*—Patrick O'Neill
(74) *Attorney, Agent, or Firm*—Imperium Patent Works; T. Lester Wallace; Darien K. Wallace (57) ABSTRACT

A clock multiplexer circuit uses a delay element to detect a transition-free period in a first signal present on a D-input lead of an output latch. The output latch is then controlled to latch the stable value of the first signal, and to hold the value of the first signal on an output lead of the clock multiplexer circuit. The clock multiplexer circuit then controls a multiplexer of the clock multiplexer circuit to couple a second signal onto the D-input lead of the output latch. The clock multiplexer circuit then enables the output latch synchronously with respect to the second signal such that the output latch is made transparent at a time when the second signal on the D-input of the output latch is stable and not transitioning. The result is glitch free clock switching from the first signal to the second signal.

20 Claims, 6 Drawing Sheets

FIG. 1

ASYNCHRONOUS CLOCK SWITCHING

FIG. 2

SYNCHRONOUS CLOCK SWITCHING

GLITCH FREE CLOCK MULTIPLEXER THAT USES A DELAY ELEMENT TO DETECT A TRANSITION-FREE PERIOD IN A CLOCK SIGNAL

BACKGROUND INFORMATION

Many clock multiplexers produce glitches under some conditions when switching from one clock source to another clock source. Some clock multiplexing schemes place restrictions on the switch control events and/or on the clock signals being switched. An example is U.S. Pat. No. 6,075,392 which assumes that the switch control events are synchronous to the currently selected clock signal and also assumes that the currently selected clock signal is active and transitioning. If the currently selected clock signal begins to start transitioning erratically or fails entirely such that it is no longer transitioning, then the clock multiplexing scheme may not be able to transition from the currently selected clock signal to another clock signal in a glitch-free manner.

SUMMARY

A clock multiplexer circuit uses a delay element to detect a transition-free period in a first signal present on a D-input lead of an output latch. The output latch is then controlled to latch the stable value of the first signal, and to hold the value of the first signal on an output lead of the clock multiplexer circuit. The clock multiplexer circuit then controls a multiplexer of the clock multiplexer circuit to couple a second signal onto the D-input lead of the output latch. The clock multiplexer circuit then enables the output latch synchronously with respect to the second signal such that the output latch is made transparent at a time when the second signal on the D-input of the output latch is stable and not transitioning. The result is glitch-free clock switching from the first signal to the second signal.

Proper glitch-free operation of the clock multiplexer circuit does not depend on the first signal transitioning as a proper clock signal. Proper operation of the clock multiplexer circuit does not require that the first clock be transitioning at all. In one novel aspect, the first signal is passed through a delay element. A digital value on the input lead of the delay element is compared to a digital value on the output lead of the delay element. If the two digital values are detected to be identical during a time when the clock signal is to be switched, then the first signal is determined to be stable and the stable value of the first signal is latched into the output latch. This circuitry causes the output latch to be latched properly even if the first signal is not transitioning (for example, due to the first signal being a clock signal that has failed and has stopped transitioning altogether).

Further details and embodiments are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
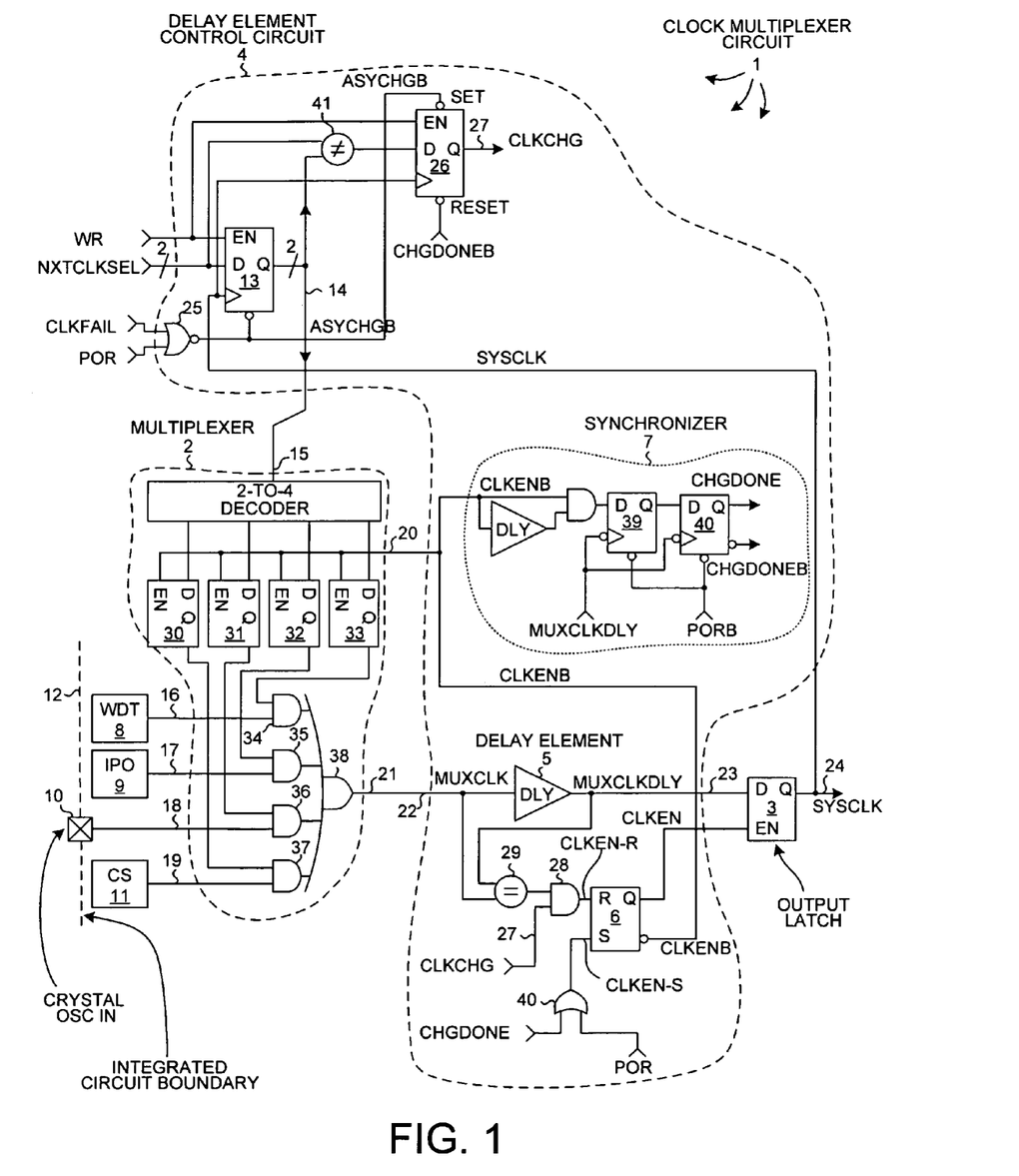
FIG. 1 is a simplified circuit diagram of a clock multiplexer circuit in accordance with one novel aspect.

FIG. 1 is a simplified circuit diagram of a clock multiplexer-circuit 1 in accordance with one novel aspect. Clock multiplexer circuit 1 includes a multiplexer 2, a latch 3, and a delay element control circuit 4. Delay element control circuit 4 includes a delay element 5, a sequential logic element 6, a synchronizer 7, and an amount of additional logic. Clock multiplexer circuit 1 is embodied as an integrated circuit along with a processor (not shown), a power on reset circuit (not shown), a clock fail detection circuit (not shown), a watchdog timer clock source (WDT) 8, an internal precision oscillator (IPO) 9, a terminal 10 for receiving a clock signal from an external crystal oscillator, and a fourth clock source (CS) 11. Vertical dashed line 12 represents a boundary of the integrated circuit.

An operation of clock multiplexer circuit 1 is described in connection with the waveform diagram of FIG. 2. Initially, at a prior time not represented in the waveforms of FIG. 2, a clock signal generated by the external crystal oscillator is selected as the source of a system clock signal that clocks the processor. The processor selects the clock signal from the external crystal oscillator by performing a write to an address of a two-bit register 13. Two corresponding data bits on the processor data bus are written into the two-bit register 13. The two bits are represented in FIG. 1 as the two-bit value NXTCLKSEL[1:0]. When the write occurs to the address of register 13, the signal WR is asserted as a high pulse. The two-bit value of NXTCLKSEL[1:0] is clocked into register 13 on the next rising edge of the clock signal SYSCLK during the time WR is at a high value. The two-bit value on lines 14 is supplied onto the two select input leads 15 of multiplexer 2. Multiplexer 2 has two select input leads 15, four data input leads 16-19, an enable input lead 20, and a data output lead 21. Due to the NXTCLKSEL[1:0] value being "11" (a digital three), multiplexer 2 couples its third data input lead 18 to its multiplexer data output lead 21.

Figure 2:
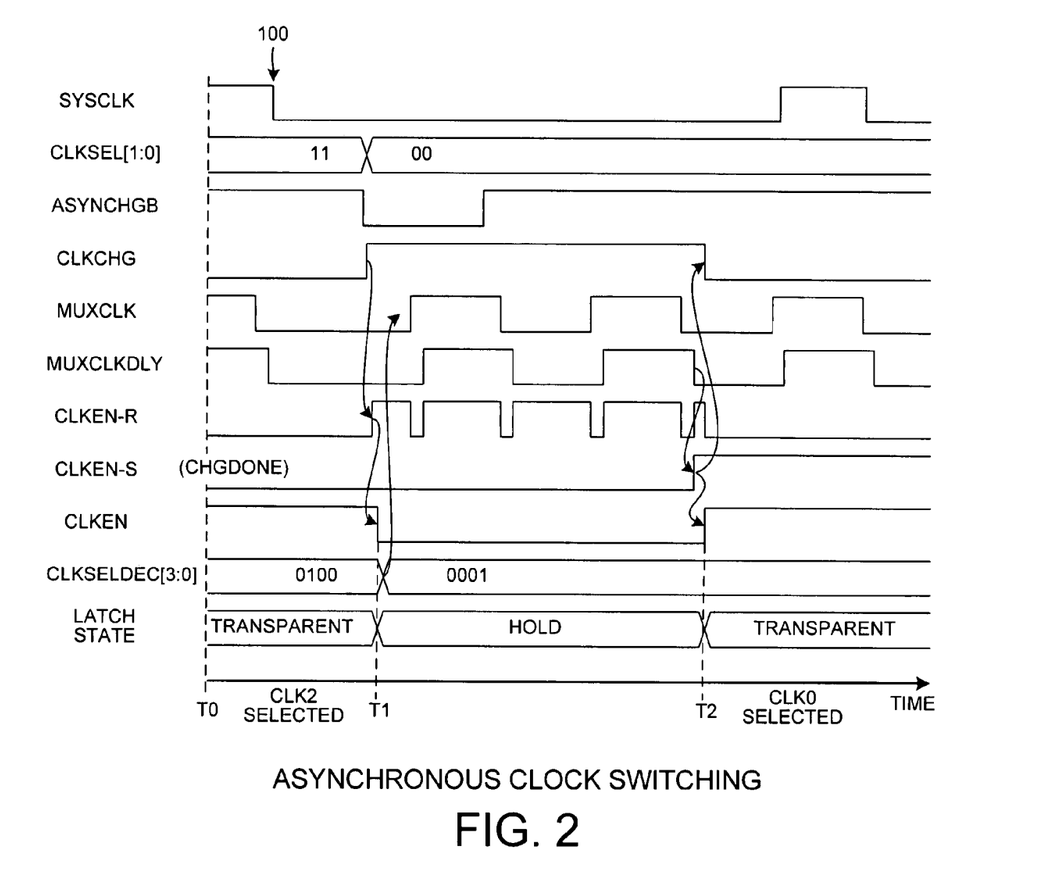
FIG. 2 is a simplified waveform diagram that illustrates an operation of the novel clock multiplexer circuit of FIG. 1 wherein the clock switching is initiated by an asynchronous event.

The clock signal from the external crystal oscillator that is present on IC terminal 10 is coupled through multiplexer 2 onto an input lead 22 of delay element control circuit 4. This signal is denoted MUXCLK in the waveform diagram of FIG. 2. The signal MUXCLK passes through delay element 5 and onto the output lead 23 of delay element control circuit 4. The delayed version of signal MUXCLK is denoted MUXCLKDLY in the waveform of FIG. 2. Latch 3 at this point is transparent. The signal MUXCLKDLY therefore passes into the D-input lead of latch 3, through latch 3, and onto the Q-output lead of latch 3 to become the signal SYSCLK on the output lead 24 of clock multiplexer circuit 1. In the present example, SYSCLK signal is the signal that clocks the processor. This is the state of the clock multiplexer circuit 1 at time T0 in the waveform diagram of FIG. 2. The clock signal generated by the external crystal oscillator passes through the clock multiplexer circuit 1 and is the SYSCLK signal. The high-to-low transition 100 (see FIG. 2)

of the signal SYSCLK in FIG. 2 is due to a high-to-low transition of the external crystal oscillator signal on terminal 10.

Next, an asynchronous clock switching event occurs as represented in the waveform of FIG. 2 by the high-to-low transition of the signal ASYNCHGB. This may, for example, be due to the clock fail circuit detecting an irregularity of the SYSCLK signal due to a malfunction of the external crystal oscillator. When the clock fail circuit detects the failure, it asserts the signal CLKFAIL to a digital high. NOR gate 25 asserts signal ASYCHGB to a digital low, thereby resetting the two-bit register 13 so that it then outputs a digital "00" value (a digital zero). This is indicated in FIG. 2 by the value "00" of the two-bit CLKSEL[1:0]00 value. Signal ASYNCHGB being a digital low causes flip-flop 26 to be asynchronously set such that the signal CLKCHG output by flip-flop 26 onto line 27 is a digital high.

The CLKCHG signal is supplied onto the lower input lead of AND gate 28. If the signal passing through delay element 5 is stable and is not transitioning for a short duration of time, then the value MUXCLK on the input lead of delay element 5 will be the same as the value MUXCLKDLY on the output lead of delay element 5. In the example of FIG. 2, the values of both MUXCLK and MUXCLKDLY are digital low values at the time that CLKCHGB transitions to a digital low value. Digital comparator 29 outputs a digital high and the signal CLKEN-R that is output by AND gate 28 transitions high and resets sequential logic element 6. Sequential logic element 6 is therefore reset when the external crystal clock signal is detected to be stable across delay element 5. The signal MUXCLKDLY will therefore also be stable for the next amount of time (the delay time of delay element 5). Sequential logic element 6 deasserts the signal CLKEN to a digital low value as indicated by the high-to-low transition of the signal CLKEN in the waveform of FIG. 2.

Latch 3 is a type of latch that is transparent when the signal on the enable EN-input lead of latch 3 is a digital high. Transparent means that the signal on the D-input lead passes through the latch and is output onto the Q-output lead of the latch. Latch 3 latches and holds the value on its D-input lead as the value that is output onto its Q-output lead when the enable signal on its EN-input lead transitions from high-to-low. As long as the enable signal is a digital low, latch 3 holds the value on its Q-output lead at this latched value.

Accordingly, when the CLKEN signal transitions from high-to-low, latch 3 latches the value of the signal MUXCLKDLY on its D-input lead. The low digital value of the signal MUXCLKDLY is therefore held on the Q-output lead as the value of the signal SYSCLK (see the upper waveform of FIG. 2) during the time that CLKEN is a digital low (see the waveform CLKEN in FIG. 2) regardless of the value of MUXCLKDLY after the time of the high-to-low transition of CLKEN. The value of SYSCLK is therefore latched at the value of the external crystal clock signal when the external crystal clock signal was determined by the delay line control circuit 4 to have been stable.

When CLKEN transitions low, CLKENB transitions high. CLKENB is supplied to the enable input leads of transparent latches 30-33 of multiplexer 2. Latches 30-33 therefore become transparent. The result of decoding the two-bit "00" value on the multiplexer input leads 15 therefore passes through the latches 30-33 and to the four AND gates 34-37. The value output by latch 33 is the only digital high. The value of the signal CLKSELDEC[3:0] output by the latches 30-33 therefore changes from "0100" (where the "1" corresponds to the external crystal oscillator) to "0001" (where the "1" corresponds to the watch dog timer). The clock signal output from watch dog timer clock source 8 is now coupled through AND gate 34 and OR gate 38 and onto the multiplexer output lead 21. The signal MUXCLK now transitions as a result of transitioning of the watch dog timer clock. The MUXCLK signals does not, however, pass through output latch 3 and onto SYSCLK due to latch 3 being latched.

The high value of CLKENB is also synchronized through synchronizer 7. The two flip-flops 39 and 40 of synchronizer 7 are clocked on the high-to-low transitions of MUXCLKDLY (flip-flops 39 and 40 are negative edge triggered). Due to multiplexer 2 having been switched to select the watchdog timer clock signal, the signal MUXCLKDLY is a delayed version of the watchdog timer clock signal. CLKENB is therefore synchronized with respect to the clock signal (watchdog timer clock) that is now being switched to. Note that the low-to-high transition of CLKENB exits synchronizer 7 as the low-to-high transition of signal CHGDONE in the waveform of FIG. 2 shortly after a high-to-low transition of MUXCLKDLY. The low-to-high transition of CHGDONE is synchronous with respect to the watchdog timer clock signal (MUXCLKDLY).

When CHGDONE transitions high, OR gate 40 asserts the signal CLKEN-S on the set input lead of sequential logic element 6 to a digital high. Sequential logic element 6 is set, and the signal CLKEN transitions to a digital high. The low-to-high transition of CLKEN is indicated at time T2 in the waveforms of FIG. 2. When signal CLKEN transitions high, output latch 3 is made transparent. The low value of MUXCLKDLY is therefore allowed to pass through output latch 3. Accordingly, after time T2 the LATCH STATE is denoted TRANSPARENT and CLK0 (the watchdog timer clock) is selected. The watchdog timer clock is now passing through the clock multiplexer circuit 1 and is output to the processor as the SYSCLK signal.

When CHGDONE transitions high, CHGDONEB transitions low and resets flip-flop 26, thereby causing signal CLKCHG to be deasserted to a low logic value as illustrated in FIG. 2. At a later time after the period of time illustrated in FIG. 2, synchronizer 7 deasserts the CHGDONE signal to a digital low synchronously with respect to the MUXCLKDLY signal. This ends the clock switching process. The signal CHDDONE returning to a digital low removes the asynchronous set on the set input lead of sequential logic element 6 and removes the asynchronous reset on the reset input lead of flip-flop 26. FIG. 2 illustrates an automatic switching from the external crystal oscillator clock signal to the watchdog timer clock signal upon the detection of a failure of the crystal oscillator clock signal.

Figure 3:
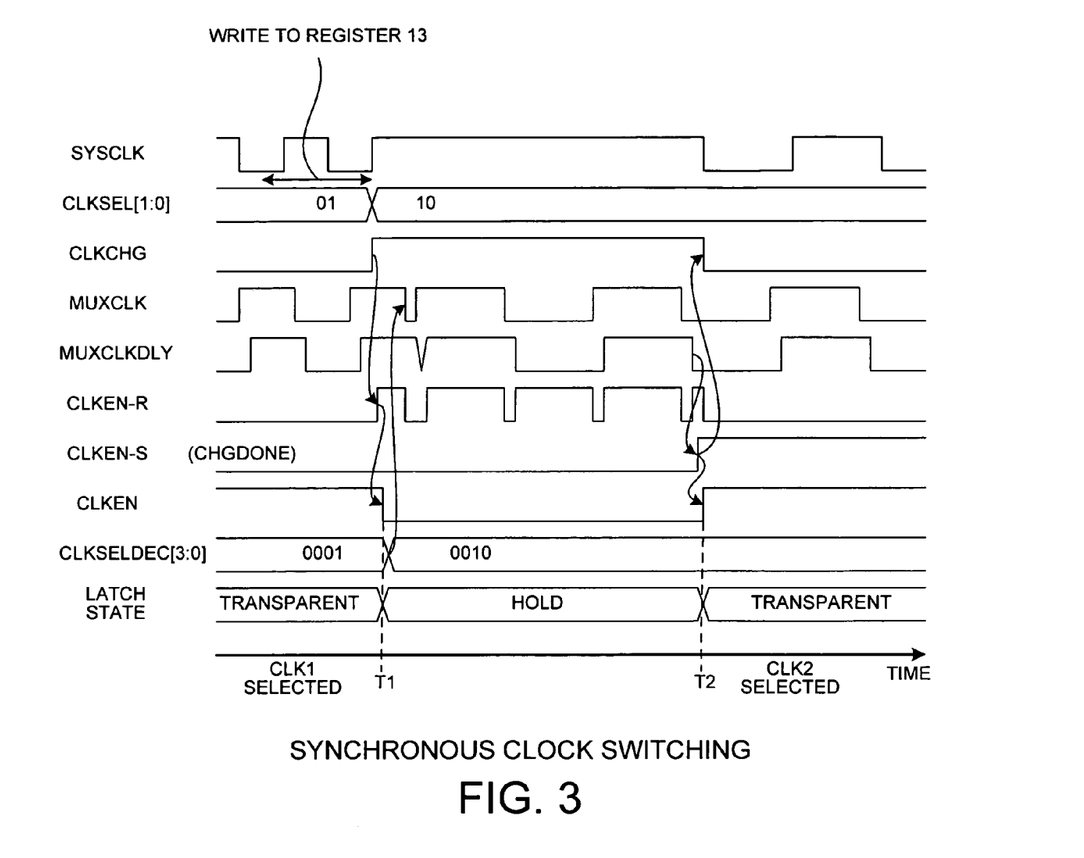
FIG. 3 is a simplified waveform diagram that illustrates an operation of the novel clock multiplexer circuit of FIG. 1 wherein the clock switching is initiated by a synchronous event.

FIG. 3 illustrates an operation of the clock multiplexer circuit 1 of FIG. 1 when a source of a clock signal is switched as a result of a synchronous clock switching event. The synchronous clock switching event that causes the switching of clock signals represented in FIG. 3 is a processor write to two-bit register 13. Initially, register 13 contains the two-bit value "01" (corresponding to the internal precision oscillator (IPO)). An internal precision oscillator clock signal on multiplexer data input lead 17 passes through multiplexer 2, through delay element 5, through output latch 3, and onto output lead 24.

Next, the processor writes the two-bit value "10" into register 13 (corresponding to the external crystal oscillator). This write occurs synchronously with respect to the SYSCLK. When the processor addresses register 13 during a write cycle, the signal WR pulses to a digital high value. When SYSCLK transitions high during the time WR is high, the two-bit data bus value is clocked into register 13 and appears as value CLKSEL[1:0]. Note that in FIG. 3, CLKSEL[1:0] changes value from "01" to "10" on a rising edge of SYSCLK.

When the value of CLKSEL[1:0] changes value, flip-flop 26 is loaded with a digital one such that signal CLKCHG is asserted to a digital high value. In the example of FIG. 1, comparator 41 detects a difference between the two-bit value being written into register 13 and the two-bit value CLKSEL[1:0] being output by register 13. When comparator 41 detects this condition, it outputs a digital high value that is clocked into flip-flop 26 on a rising edge of SYSCLK.

Signal CLKCHG being asserted high causes AND gate 28 to output a digital high when the internal precision oscillator clock signal is stable (as detected by MUXCLK and MUXCLKDLY having the same values). When such a stable condition is detected, then the reset signal CLKEN-R on the reset input lead of sequential logic element 6 is asserted to a digital logic high. The resetting of sequential logic element 6 causes sequential logic element 6 to force the CLKEN signal to a digital low, thereby latching the stable value of MUXCLKDLY into output latch 3. At time T1 in the waveform diagram of FIG. 3 CLKEN transitions low and LATCH STATE changes from TRANSPARENT to HOLD.

When CLKEN transitions to a digital low, CLENB transitions to a digital high. As explained above in connection with FIG. 2, latches 30-33 of multiplexer 2 are made transparent. The new value multiplexer select values as decoded by the 2-to-4 decoder of multiplexer select values as decoded by the 2-to-4 decoder of multiplexer 2 (CLKSELDEC [3:0]) change from "0001" (corresponds to the internal precision oscillator) to "0010" (corresponds to the external crystal oscillator terminal 10). After multiplexer 2 switches to select the external crystal oscillator signal on terminal 10, the external crystal oscillator signal passes from terminal 10, through data input lead 18, to output lead 21, and through delay element 5 and onto the D-input lead of output latch 3. Output latch 3, however, is latched. The external crystal oscillator clock signal therefore does not pass through output latch 3. The transitions of MUXCLK after time T1 and before time T2 in the waveforms of FIG. 3 are due to transitions of the external crystal oscillator clock signal.

As explained above in connection with FIG. 2, the high value of CLKENB is synchronized by synchronizer 7. MUXCLKDLY clocks flip-flops 39 and 40 of synchronizer 7, so CLKENB is synchronized with respect to the newly switched-to clock. Two falling edges of the MUXCLKDLY later, the synchronizer 7 asserts the signal CHGDONE to a digital high. CHGDONE transitioning high causes OR gate 40 to assert the set signal CLKEN-S on the set input lead of sequential logic element 6 to a digital high. Sequential logic element 6 is therefore set, and signal CLKEN transitions high as illustrated at time T2 in FIG. 3. When CLKEN transitions high, output latch 3 is made transparent. The stable value of MUXCLKDLY is now coupled through output latch 3 onto output lead 24. Stability of the MUXCLKDLY signal on the D-input lead of output latch 3 is assured, because synchronizer 7 asserts the CHGDONE signal (that causes the CLKEN signal on the enable input lead of latch 3 to be asserted) in response to a falling edge of the MUXCLKDLY signal itself. Accordingly, note that in FIG. 3 the LATCH STATE changes at time T2 from HOLD to TRANSPARENT. After time T2, output latch 3 is transparent and the external crystal oscillator clock signal passes from terminal 10, through multiplexer 2, through delay element 5, through output latch 3, and onto output lead 24.

When CHGDONE transitions high, signal CHGDONEB transitions low. This resets flip-flop 26, thereby deasserting the signal CLKCHG to a digital low. At a later time after the period of time illustrated in FIG. 3, synchronizer 7 deasserts the CHGDONE signal to a digital low synchronously with respect to the MUXCLKDLY signal. Deasserting CHGDONE removes the asynchronous setting of flip-flop 6 and removes the asynchronous resetting of flip-flop 26. This ends the clock switching process.

Figure 4:
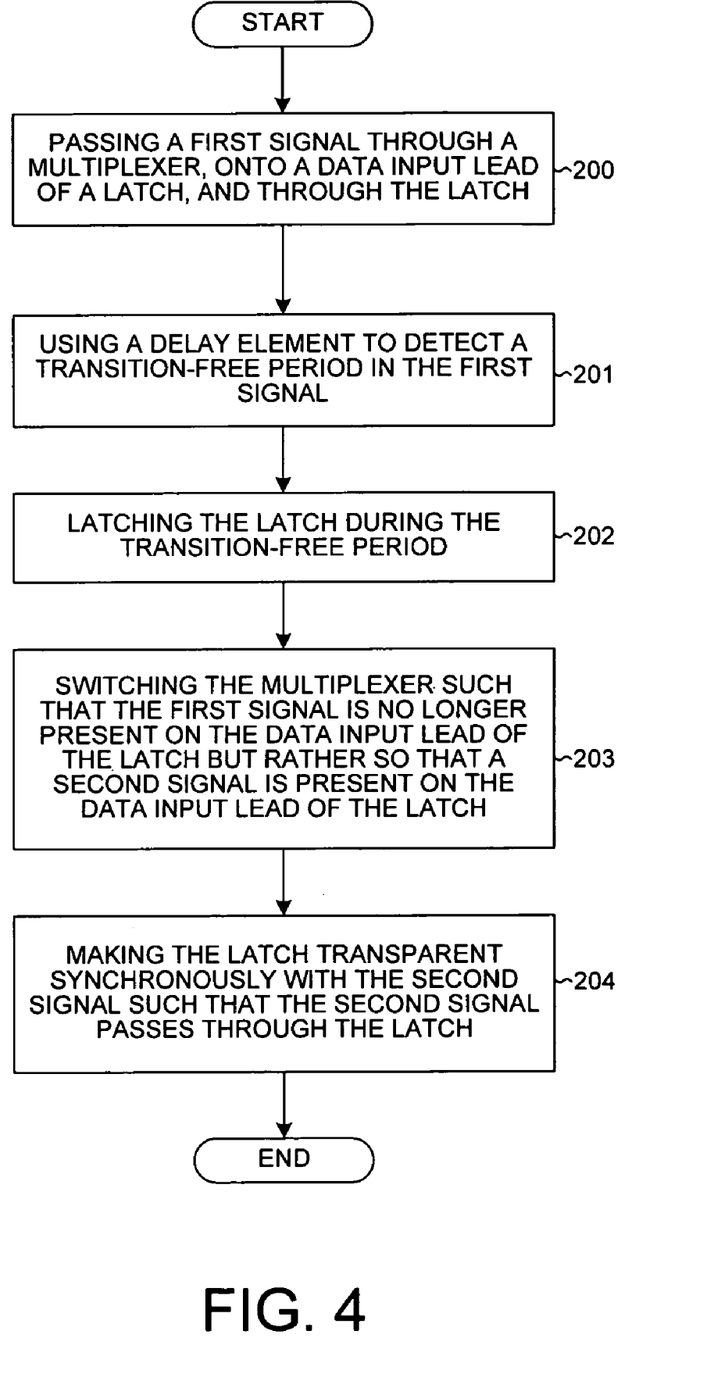
FIG. 4 is a flowchart of a novel method.
Figure 5:
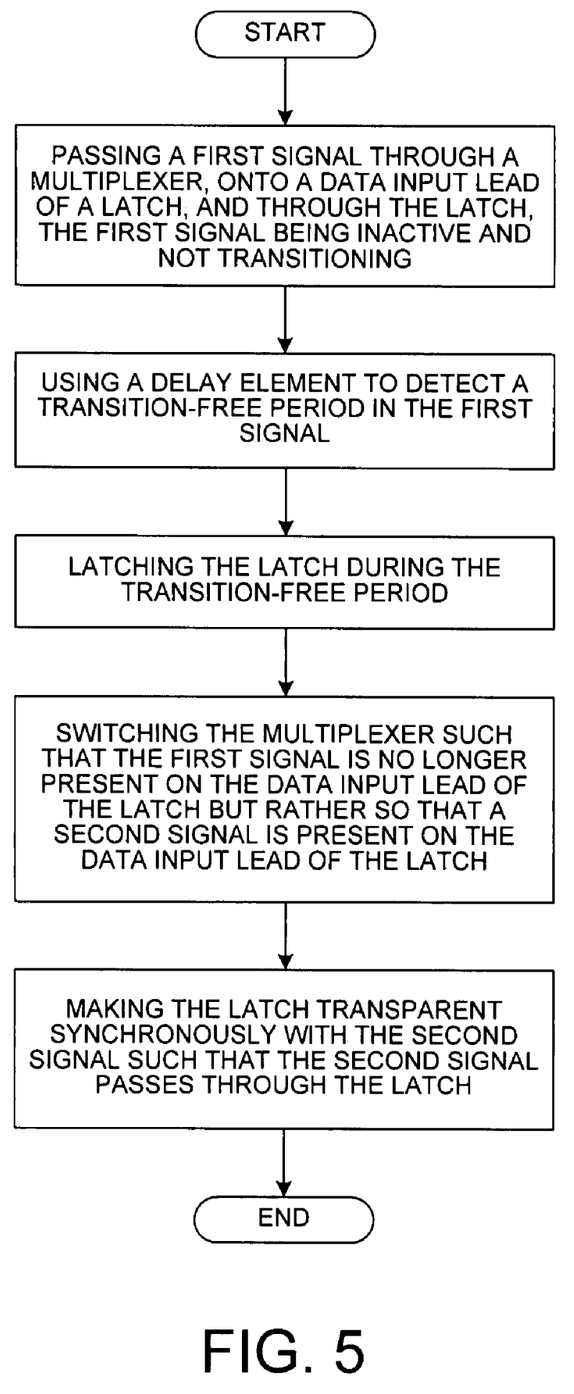
FIG. 5 is a flowchart of another embodiment of the novel method.
Figure 6:
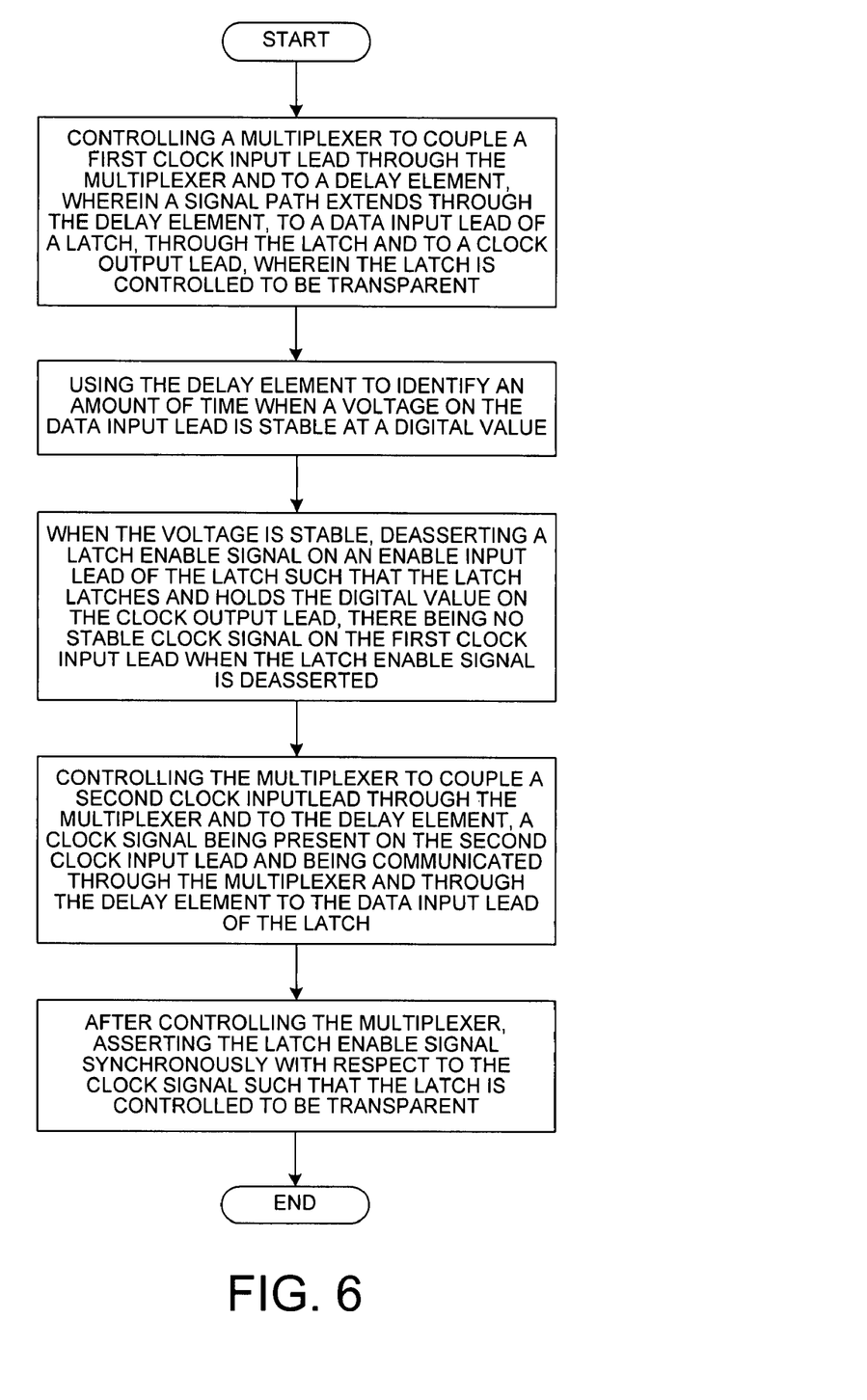
FIG. 6 is a flowchart of yet another embodiment of the novel method.

FIG. 4 is a simplified flowchart of a novel method. In a first step (step 200), a first signal passes through the clock multiplexer circuit 1 by passing through an output latch. In the example of FIG. 1, the first signal passes through latch 3 which is controlled to be transparent.

Next (step 201), a delay element is used detect a transition-free period in the first signal. In the example of FIG. 1, when the digital value on the input lead of delay element 5 is the same as the digital value on the output lead of delay element 5 at a time when a clock change is to occur as indicated by the signal CLKCHG being asserted, then the signal CLKEN-S is asserted high. This amounts to detection of a transition-free period in the first signal.

Next (step 202), the output latch is latched during the transition-free period such that the stable value of the first signal is held by the output latch. In the example of FIG. 1, the signal CLKEN transitions low, thereby latching the stable value of MUXCLKDLY on the D-input lead of latch 3 into latch 3. Latch 3 thereafter holds the stable value of MUXCLKDLY on the output lead of latch 3 as long as signal CLKEN remains a digital low.

Next (step 203), the multiplexer is switched such that the first signal is no longer present on the D-input lead of the output latch but rather so that a second signal is present on the D-input lead of the output latch. In the example of FIG. 1, the signal CLKENB transitioning to a digital high causes latches 30-33 to become transparent, thereby changing which one of the multiplexer data input leads 16-19 is coupled to the multiplexer output lead 21. The second signal on the newly selected multiplexer data input lead passes through multiplexer 2, through delay element 5, and onto the D-input lead of output latch 3. Because CLKEN is a digital low, output latch 3 is not transparent. The newly selected second signal therefore does not pass through the output latch 3.

Next (step 204), the output latch is made transparent synchronously with the second signal such that the second signal is allowed to pass through the output latch. In the example of FIG. 1, the signal CLKEN is synchronized by synchronizer 7 to generate a CHGDONE signal that transitions high synchronously with respect to the second signal. CHGDONE transitioning high causes sequential logic element 6 to be set, thereby asserting the CLKEN signal to a digital high. CLKEN being asserted high causes output latch 3 to be made transparent shortly after a falling edge of the MUXCLKDLY signal. Due to the synchronous manner in which output latch 3 is made transparent, the second signal (in the form of MUXCLKDLY) is stable when output latch 3 is made transparent and no glitches are introduced onto output lead 24. The newly switched to clock signal on the D-input lead of output latch 3 is therefore allowed to pass through output latch 3 and onto output lead 24.

Although certain specific embodiments are described above for instructional purposes, the teachings of this patent document have general applicability and are not limited to the specific embodiments described above. The clock switching function of the specific circuit of FIG. 1 can be performed by other circuits. The specific circuit of FIG. 1 is provided as one example of a suitable circuit. In one example, the circuit that detects a transition-free period in the clock signal includes a delay line having more than two taps. A multiple input comparator circuit such as an AND gate simultaneously receives the signal off of each of these multiple taps and outputs a single digital logic output signal indicative of a condition when the received signals all have the same logic value. Accordingly, various modifications, adaptations, and combinations of various features of the described embodiments can be practiced without departing from the scope of the invention as set forth in the claims.

What is claimed is:

1. A method comprising:
   (a) passing a first signal through a multiplexer, onto a data input lead of a latch, and through the latch, wherein the latch is transparent during (a);
   (b) using a delay element to detect a transition-free period in the first signal;
   (c) latching the latch during the transition-free period based at least in part on the detecting of (b);
   (d) switching the multiplexer such that the first signal is no longer present on a data input lead of the latch but so that a second signal is present on the data input lead of the latch; and
   (e) after the switching of (d) making the latch transparent synchronously with the second signal such that the signal passes through the latch.

2. The method of claim 1, wherein the first signal is inactive and is not transitioning.

3. The method of claim 1, wherein the latch is made transparent in (e) at least one period of the second signal after the switching of (d).

4. The method of claim 1, wherein the latch is made transparent in (e) in response to an edge of the second signal.

5. The method of claim 1, wherein prior to the switching of (d) the first signal passed in a signal path through the multiplexer, through the delay element, and then through the latch.

6. A method comprising:
   (a) controlling a multiplexer to couple a first clock input lead, through the multiplexer and to a delay element, wherein a signal path extends through the delay element, to a data input lead of a latch, through the latch and to a clock output lead, wherein the latch is controlled to be transparent;
   (b) using the delay element to identify an amount of time when a voltage on the data input lead is stable at a digital value;
   (c) when the voltage is stable as identified in (b) then deasserting a latch enable signal on an enable input lead of the latch such that the latch latches and holds the digital value on the clock output lead;
   (d) controlling the multiplexer to couple a second clock input lead, through the multiplexer and to the delay element, wherein a clock signal is present on the second clock input lead and is communicated through the multiplexer and through the delay element and to the data input lead of the latch; and
   (e) after the controlling of (d) asserting the latch enable signal synchronously with respect to the clock signal such that the latch is controlled to be transparent.

7. The method of claim 6, wherein the latch enable signal is asserted in (e) in response to an edge of the clock signal on the data input lead of the latch, wherein the edge occurs at least one period of the clock signal after the deasserting of the latch enable signal in (c).

8. The method of claim 6, wherein there is no stable clock signal on the first clock input lead when the latch enable signal is deasserted in (c).

9. The method of claim 6, further comprising:
   (f) receiving a clock change signal, wherein the deasserting of the latch enable signal in (c) occurs in response to the receiving of the clock change signal.

10. The method of claim 9, wherein the clock change signal can be asserted as a result of a write by a processor to a register.

11. A method comprising:
    (a) controlling a multiplexer to couple a first clock input lead, multiplexer, through the multiplexer and to a delay element, wherein a signal path extends through the delay element, to a data input lead of a latch, through the latch and to a clock output lead, wherein the latch is controlled to be transparent;
    (b) using the delay element to identify an amount of time when a voltage on the data input lead is stable at a digital value;
    (c) when the voltage is stable as identified in (b) then deasserting a latch enable signal on an enable input lead of the latch such that the latch latches and holds the digital value on the clock output lead, wherein the deasserting of the latch enable signal involves setting a sequential logic element to a first state in response to the identifying of the amount of time in (b);
    (d) controlling the multiplexer to couple a second clock input lead, through the multiplexer and to the delay element, wherein a clock signal is present on the second clock input lead and is communicated through the multiplexer and through the delay element and to the data input lead of the latch; and
    (e) after the controlling of (d) asserting the latch enable signal synchronously with respect to the clock signal such that the latch is controlled to be transparent, wherein the sequential logic element outputs the latch enable signal, wherein the latch enable signal is passed through a synchronizer that is clocked by the clock signal, the synchronizer outputting a signal that sets the sequential logic element to the second state, wherein the setting of the sequential logic element to the second state results in the asserting of the latch enable signal in (e).

12. A method comprising:
    (a) controlling a multiplexer to couple a first clock input lead, through the multiplexer and to a delay element, wherein a signal path extends through the delay element, to a data input lead of a latch, through the latch and to a clock output lead, wherein the latch is controlled to be transparent;
    (b) using the delay element to identify an amount of time when a voltage on the data input lead is stable at a digital value;
    (c) when the voltage is stable as identified in (b) then deasserting a latch enable signal on an enable input lead of the latch such that the latch latches and holds the digital value on the clock output lead;
    (d) controlling the multiplexer to couple a second clock input lead, through the multiplexer and to the delay element, wherein a clock signal is present on the second clock input lead and is communicated through the multiplexer and through the delay element and to the data input lead of the latch;
    (e) after the controlling of (d) asserting the latch enable signal synchronously with respect to the clock signal such that the latch is controlled to be transparent; and (f) receiving a clock change signal, wherein the deasserting of the latch enable signal in (c) occurs in response to the receiving of the clock change signal, wherein the clock change signal is automatically asserted when a signal is asserted taken from the group consisting of: a power on reset signal, and a clock fail signal.

13. A clock multiplexer circuit, comprising:

a multiplexer having a first multiplexer input lead, a second multiplexer input lead, and a multiplexer output lead;

a latch having a latch data input lead, a latch enable input lead, and a latch output lead; and a delay element control circuit having a delay element, an input lead coupled to the multiplexer output lead and an output lead coupled to the latch data input lead, wherein the delay element control circuit deasserts a latch enable signal onto the latch enable input lead when a signal on the latch data input lead is stable and when the multiplexer is coupling the first multiplexer input lead to the multiplexer output lead, wherein the delay element control circuit determines when the signal on the latch data input lead is stable by comparing a signal on an input lead of the delay element to a signal on an output lead of the delay element, the delay element control circuit then causing the multiplexer to couple a clock signal on the second multiplexer input lead onto the multiplexer output lead, the delay element control circuit then asserting the latch enable signal synchronously with the clock signal to couple the clock signal onto the latch output lead.

14. The clock multiplexer of claim 13, wherein the latch is transparent when the latch enable signal is asserted, and wherein the latch is latched when the latch enable signal is deasserted.

15. The clock multiplexer of claim 13, wherein the delay element control circuit is coupled to no clock signals other than the signal on the input lead of the delay element and the clock signal coupled onto the latch output lead.

16. The clock multiplexer of claim 13, wherein the delay element control circuit asserts the latch enable signal such that the latch enable signal is asserted shortly after and in response to an edge of the clock signal.

17. A clock multiplexer circuit, comprising:

a multiplexer having a first multiplexer input lead, a second multiplexer input lead, and a multiplexer output lead;

a latch having a latch data input lead, a latch enable input lead, and a latch output lead; and a delay element control circuit having an input lead coupled to the multiplexer output lead and an output lead coupled to the latch data input lead, wherein the delay element control circuit deasserts a latch enable signal onto the latch enable input lead when a signal on the latch data input lead is stable and when the multiplexer is coupling the first multiplexer input lead to the multiplexer output lead, the delay element control circuit then causing the multiplexer to couple a clock signal on the second multiplexer input lead onto the multiplexer output lead, the delay element control circuit then asserting the latch enable signal synchronously with the clock signal to couple the clock signal onto latch output lead, wherein the delay element control circuit comprises:

a delay element having an input lead and an output lead, wherein the delay element control circuit determines when the signal on the latch data input lead is stable by comparing a signal on the input lead of the delay element to a signal on the output lead of the delay element;

a sequential logic element that is set to a first state in response to the delay element control circuit determining that the signal on the latch data input lead is stable, the sequential logic element outputting the latch enable signal; and a synchronizer that is clocked by the clock signal, wherein the latch enable signal is passed through the synchronizer, the synchronizer outputting a signal that sets the sequential logic element to a second state, wherein the setting of the sequential logic element to the second state results in the asserting of the latch enable signal.

18. A circuit comprising:

a multiplexer;

a latch, wherein a signal is coupled through the multiplexer and onto a latch data input lead of the latch; and means for delaying the signal to determined when the signal is stable and for latching a value of the signal into the latch when the signal is determined by the means to be stable, the means also being for controlling the multiplexer such that a clock signal is then coupled through the multiplexer and onto the latch data input lead, the means also being for then making the latch transparent synchronously with the second clock signal.

19. The circuit of claim 18, wherein the means comprises:

means for comparing the signal that is coupled through to the multiplexer to a delayed version of the signal, wherein the delayed version of the signal is present on the latch data input lead of the latch.

20. The circuit of claim 19, wherein the means for comparing comprises:

a delay element having an input lead and an output lead; and a comparator having a first input lead coupled to the input lead of the delay element, the comparator having a second input lead coupled to the output lead of the delay element.

* * * * *